C. R. DUPAS.
AUTOMOBILE SIGNAL.
APPLICATION FILED APR. 14, 1917.
1,264,030.
Patented Apr. 23, 1918.
2 SHEETS—SHEET 1.
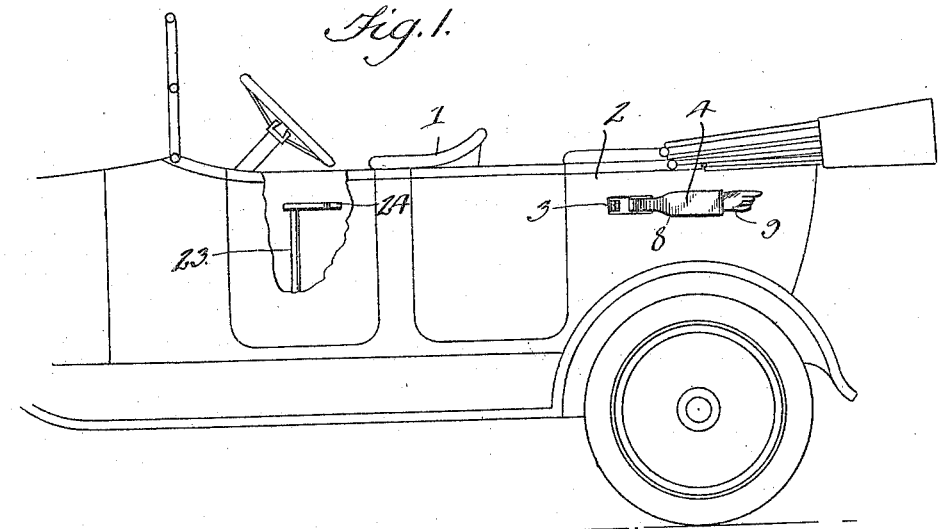
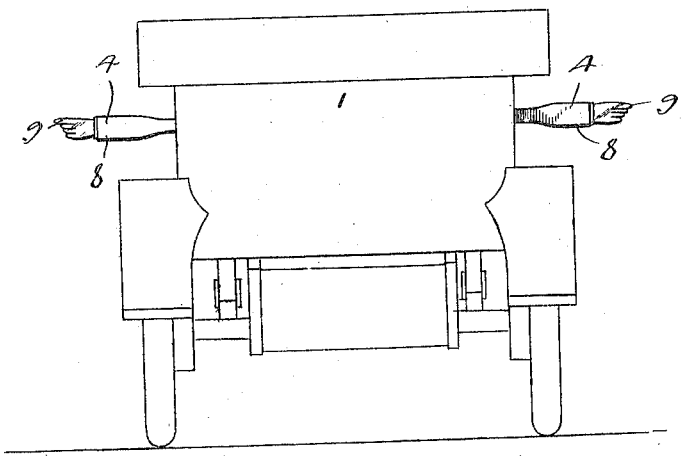
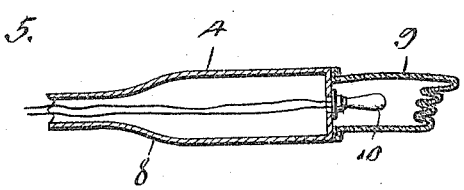
WITNESSES
INVENTOR
C. R. Dupas,
BY Victor J. Evans
ATTORNEY C. R. DUPAS.
AUTOMOBILE SIGNAL.
APPLICATION FILED APR. 14, 1917.
1,264,030.
Patented Apr. 23, 1918.
2 SHEETS—SHEET 2.
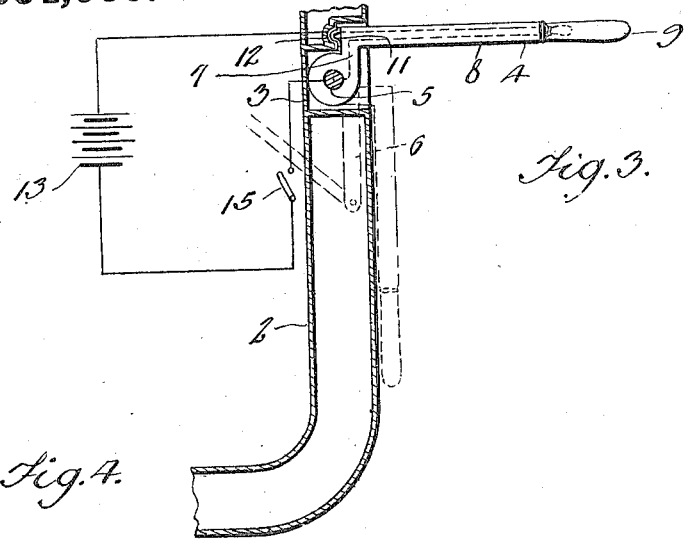
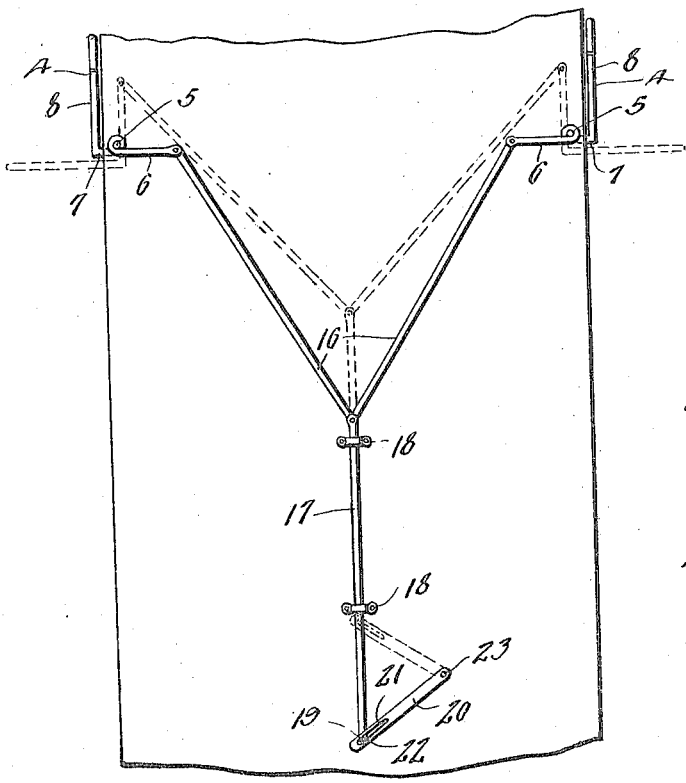
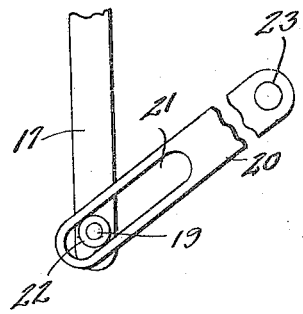
WITNESSES
INVENTOR
C. R. Dupas,
BY Victor J. Evans
ATTORNEY

UNITED STATES PATENT OFFICE.

CÉSAIRE RUDOLPH DUPAS, OF NEW ORLEANS, LOUISIANA.

AUTOMOBILE-SIGNAL.

1,264,030.

Specification of Letters Patent.

Patented Apr. 23, 1918.

Application filed April 14, 1917. Serial No. 162,069.

*To all whom it may concern:*

Be it known that I, CÉSAIRE R. DUPAS, a citizen of the United States, residing at New Orleans, in the parish of Orleans and State of Louisiana, have invented new and useful Improvements in Automobile-Signals, of which the following is a specification.

This invention relates to improvements in vehicle directional signals, and has particular reference to a signal adapted to indicate proposed movements of a motor car.

In carrying out this invention, it is my purpose to provide an improved signal indicator which will more readily attract attention when in the operative position; and it is my further intention to provide a more efficient and convenient means for operating such indicator; or a plurality of indicators simultaneously.

Another object is to provide means for attaching such an indicator to an automobile or other vehicle whereby the operative mechanism will be less conspicuous.

With these and other objects in view, the invention consists in the construction, combination, and arrangement of parts illustrated in the accompanying drawings and described in the specification and claim below.

In the drawings,

Figure 1 is a side elevation of an automobile having the signal device constituting the present invention applied thereto.

Fig. 2 is a rear elevation, showing the indicators in operative position.

Figure 3 is a fragmentary plan view of a portion of an automobile body wherein an indicator is mounted.

Fig. 4 is a perspective view, showing indicators and operative mechanism therefor dissociated from the automobile.

Fig. 5 shows details of the indicator.

Fig. 6 shows details of the operative mechanism.

Referring now to the drawings in detail, 1 represents an automobile which may be of any convenient type, and which is provided with a body inclosed by a wall 2, preferably hollow, as commonly constructed, but which may be solid. At convenient points in the wall of the body, and located in the present instance upon either side of the body toward the rear, are recesses 3 formed exteriorly in the wall. Each recess is adapted to receive for swinging movement the inner extremity of an indicator 4, and for this purpose a shaft 5 is extended downwardly through the wall, and is provided for rotation with suitable journals attached at convenient points to the body; and terminates, preferably at a point below the floor of the car, in an arm 6, projecting laterally from the shaft for rotation thereof, and keyed or otherwise securely affixed thereto.

The upper portion of the shaft 5 extends into the respective recess 3 and has affixed thereto the inner extremity of the indicator 4, which is thereby adapted for actuation in a horizontal plane upon partial rotation of the arm 6 on the other end of the shaft. The indicator is bent, preferably at a right angle, a short distance from the point of attachment to the shaft to form a short limb 7 and a long limb 8, whereby in the inoperative position of the indicator the short limb will project from the recess perpendicularly to the wall of the car, and the long limb will extend rearwardly of the car parallel and in proximity to the body. In the operative position, the short limb will enter the recess, while the long limb will project laterally from the body for indication of a proposed movement of the vehicle. In the present instance, the long limb is formed to represent a human arm terminating in a hand 9 constructed of transparent or translucent material which may be of any desired color and in this connection, I may provide a hand of one color upon one indicator, and a hand of another color upon the other indicator. Each hand 9 is formed with a cavity and within each cavity is an illuminating device, here shown as an electric lamp 10 connected by suitable conductors to properly insulated contacts 11 which may be conveniently positioned on the face of the short limb 7 adapted to coincide with the inner wall of the recess in the inoperative position of the arm.

Contacts 12 are disposed in the recess for connection with the first mentioned contacts in the operative position of the indicator and are connected by suitable conductors to a source of electrical energy here shown as a battery 13, a switch 15 conveniently positioned for actuation by the operator of the vehicle being inserted in one of the conductors whereby the respective lamp may be rendered non-luminous when desired, as for instance, in the daytime.

For actuation of the indicators each arm 6 of a respective shaft has pivotally attached thereto, a link 16, preferably located beneath the floor of the car, and extending forwardly thereof for pivotal attachment to the extremity of a rod 17 also beneath the floor of the car. The rod 17 is adapted for longitudinal sliding movement in suitable brackets 18 which may be affixed to the under side of the floor or any other convenient support, and is provided toward the forward extremity with a means, here consisting of a pin 19, whereby the rod may be actuated by a lever 20 formed toward the point of attachment with a longitudinal slot 21 wherein the pin 19 is disposed.

A rotatable collar 22 or other friction reducing means may be positioned on the pin for contact with the inner faces of the slot. At the opposite extremity from the slot, the lever 20 is attached to a vertical shaft 23 prolonged through the floor of the car, and suitably journaled in bearings which may be affixed thereto, and provided at the upper extremity with a hand lever 24 conveniently positioned for manual actuation by the operator of the car.

While I have here shown and described the preferred form of my invention for purposes of illustration, such embodiment is not to be interpreted as in any way limiting the spirit and scope of the invention, it being apparent that many and varied forms may be constructed without departing from such spirit and scope.

What I claim is:

In combination with an automobile having recesses in its side walls, a longitudinally movable rod secured to the bottom of the automobile, means for moving said rod from the driver's seat, a vertical rod extending into each recess, a crank on each rod, links connecting said longitudinally movable rod with the cranks to rotate the rods, an indicator in each recess, said indicator consisting of a long limb and a short limb extending at right angles therefrom, said short limb engaging the vertical rod, said short limb projecting from the recess in the inoperative position of the indicator to throw the long limb close to and parallel with the wall of the automobile and lying in said recess in the operative position of the indicator to throw said long limb at right angles to the body.

In testimony whereof I affix my signature.

CÉSAIRE RUDOLPH DUPAS.

Copies of this patent may be obtained for five cents each, by addressing the "Commissioner of Patents, Washington, D. C."